Figure 1:
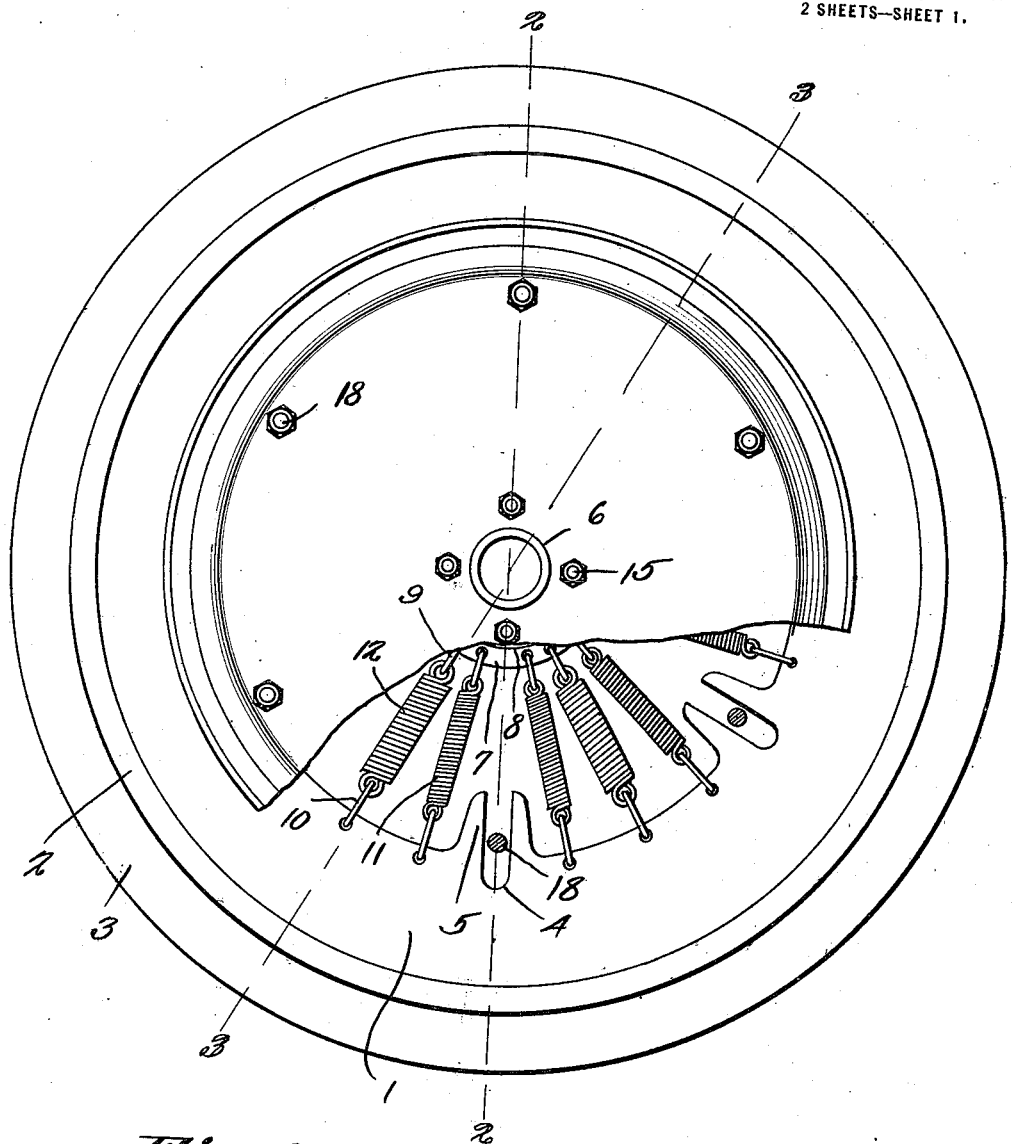

L. W. Simmons
Inventor,

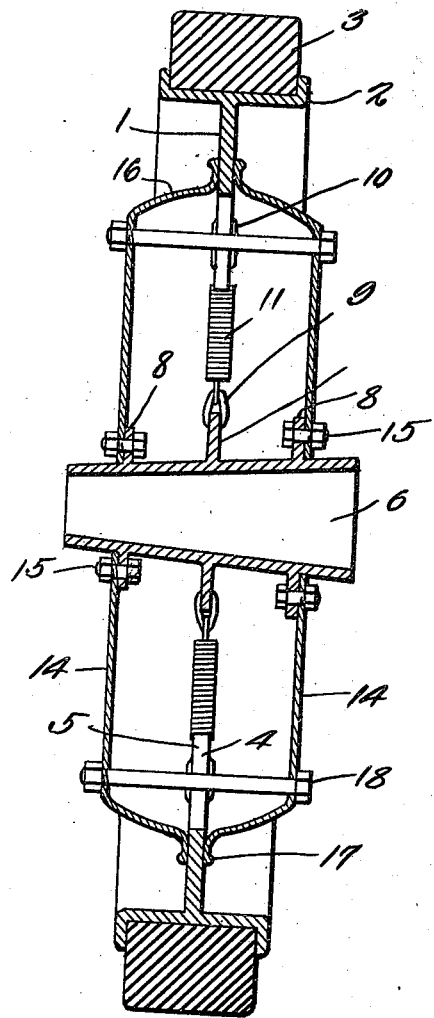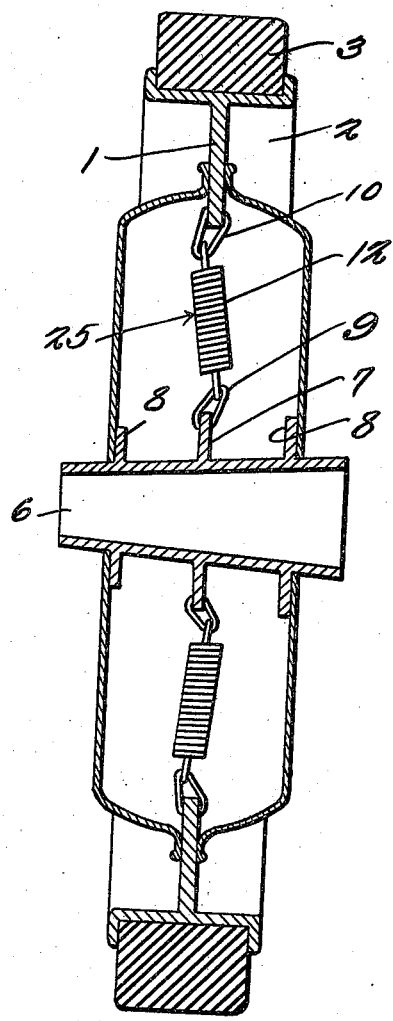

UNITED STATES PATENT OFFICE.

LEON WM. SIMMONS, OF FOREST LAKE, MINNESOTA.

SPRING WHEEL.

1,425,706.  Specification of Letters Patent.  Patented Aug. 15, 1922.

Application filed August 13, 1921. Serial No. 491,992.

*To all whom it may concern:*

Be it known that I, LEON WILLIAM SIMMONS, a citizen of the United States, residing at Forest Lake, in the county of Washington and State of Minnesota, have invented a new and useful Spring Wheel, of which the following is a specification.

The device forming the subject matter of this application is a spring wheel, and one object of the invention is to provide a device of the kind mentioned, wherein pneumatic tires, subject to puncture and deterioration may be dispensed with, the resiliency being afforded not necessarily by the tire, but by the wheel itself. Another object of the invention is so to construct the wheel that it will possess the necessary resiliency, combined with lateral stability. A further object of the invention is so to arrange the springs in the wheel, that one set of springs is brought into play after another set of springs has been expanded to a predetermined point.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a wheel constructed in accordance with the invention, parts being broken away; Figure 2 is a section on the line 2—2 of Figure 1; Figure 3 is a section on the line 3—3 of Figure 1.

The wheel forming the subject matter of this application includes an annular plate-like body 1 supporting a rim carrying a tire 3, the tire being of any desired construction, a solid tire being depicted in the present embodiment of the invention. In its inner edge, the body 1 of the wheel is supplied with radial slots 4, defined, in part, by inwardly projecting fingers 5. The numeral 6 marks a tubular hub having an outstanding intermediate flange 7 and outstanding side flanges 8. Links 9 are mounted in the intermediate flange 7, links 10 being mounted in the body 1. First retractile springs 11 are provided, the springs 11 alternating, circumferentially of the wheel, with second retractile springs 12. The retractile springs 11 and 12 preferably are of helical form, the springs 12 being stronger than the springs 11. The inner ends of the springs 11 and 12 are carried by the links 9, the outer ends of the springs being carried by the links 10. Under normal conditions, the first springs 11, only, are under tension, the second springs 12 hanging slack, as indicated at 25 in Figure 3.

Side plates 14 are provided, the hub 6 projecting through the side plates. By means of securing elements 15, the side plates 14 are connected to the flanges 8 of the hub 6. Adjacent to their outer edges, the side plates 14 are extended toward the median plane of the wheel, and terminate in outwardly prolonged annular bearing lips 17, between which the body 1 of the wheel is received slidably. The side plates 14 are united by connecting bolts 18 or the like, the said connecting bolts being received loosely in the slots 4 of the body 1 as delineated in Figure 1.

In practical operation, the first springs 11, adjacent to the top of the wheel, are under tension, the second springs 12 hanging slack, as shown at 25 in Figure 3. Under an abnormal load, that is, when the first springs are elongated to a predetermined point, the second springs 12 come into play and aid in carrying the load. The body 1 of the wheel reciprocates between the lips 17 of the side plates 14, and, thus, the necessary movement of the body of the wheel, relative to the hub 6 is permitted. The connections 18, being loosely received in the slots 4 of the body 1 permit the springs 11 and 12 to exercise their function. The connections 18, however, operating with the fingers 5 and with the edges of the slot 4, connect the body 1 of the wheel with the side plates 14, and consequently with the hub 6 for circumferential movement.

What is claimed is:—

1. In a spring wheel, a hub; a wheel body; means for guiding the wheel body for sliding movement transversely of the hub; and first and second springs connecting the wheel body with the hub, the first springs being normally active, the second springs being normally slack, the second springs being elongated after the first springs have been stretched beyond a predetermined point.

2. In a device of the class described, a hub; side plates carried by the hub; a wheel body slidable between the side plates and having fingers; connecting devices uniting the side plates and received between the fingers; and springs of different strengths connected to the hub and the wheel body, the weaker springs being normally active, and the stronger springs becoming active, after the weaker springs have been elongated to a predetermined point.

In testimony that I claim the foregoing as my own, I have hereto affixed my signature in the presence of two witnesses.

LEON WM. SIMMONS.

Witnesses:
A. L. ERICKSON,
G. T. SPRAIN.